(12) United States Patent
Koch et al.

(10) Patent No.: US 11,977,263 B2
(45) Date of Patent: May 7, 2024

(54) CONNECTOR PART FOR AN OPTICAL PLUG-IN CONNECTION

(71) Applicant: NEUTRIK AG, Schaan (LI)

(72) Inventors: Matthias Koch, Götzis (AT); Victor Coggi, Losone (CH); Dionigi Sergio Fantini, Ghirla (IT)

(73) Assignee: Neutrik AG, Schaan (LI)

( * ) Notice: Subject to any disclaimer, the term of this patent is extended or adjusted under 35 U.S.C. 154(b) by 0 days.

(21) Appl. No.: 16/973,259

(22) PCT Filed: Jun. 24, 2019

(86) PCT No.: PCT/EP2019/066641
§ 371 (c)(1),
(2) Date: Dec. 8, 2020

(87) PCT Pub. No.: WO2020/002213
PCT Pub. Date: Jan. 2, 2020

(65) Prior Publication Data
US 2021/0247571 A1  Aug. 12, 2021

(30) Foreign Application Priority Data
Jun. 28, 2018 (EP) .................................. 18180296

(51) Int. Cl.
*G02B 6/38* (2006.01)
(52) U.S. Cl.
CPC ........... *G02B 6/387* (2013.01); *G02B 6/3821* (2013.01); *G02B 6/3846* (2013.01); *G02B 6/3893* (2013.01)
(58) Field of Classification Search
CPC .................................................. G02B 6/3821
See application file for complete search history.

(56) References Cited

U.S. PATENT DOCUMENTS

| 4,611,887 A | * | 9/1986 | Glover | ................. G02B 6/3831 |
| | | | | 385/69 |
| 7,220,061 B2 | | 5/2007 | De Marchi | |

(Continued)

FOREIGN PATENT DOCUMENTS

| BE | 0803748 B1 | * | 3/2005 | ........... G02B 6/3821 |
| EP | 0 156 397 A2 | | 10/1985 | |

(Continued)

OTHER PUBLICATIONS

European Search Report Corresponding to 18180296 dated Dec. 12, 2018.

(Continued)

*Primary Examiner* — Eric Wong
(74) *Attorney, Agent, or Firm* — Volpe Koenig (57) ABSTRACT

A connector part (1) for an optical plug-in connection comprises a pin holder (2) and at least two pin sleeves (3, 3') accommodated in the pin holder, wherein a connector pin (4, 4') having an optical waveguide is fixed in each of said pin sleeves. The connector part also comprises a connector housing (8), which is connected to the pin holder and completely or partially surrounds the connector pins and which has latching means (9) for creating a latching connection to a mating connector part. An unlocking carriage (11) displaceably mounted on the connector housing is provided to release the latching connection to the mating connector part. The pin holder consists of two half shells (12, 12') which can be or are latched to one another and the connector housing also can be or is latched to the pin holder. A connector part of this kind can be installed fitted and removed without tools even in difficult field conditions, resulting in a significant time saving for optical plug-in connections.

14 Claims, 12 Drawing Sheets

(56) References Cited

U.S. PATENT DOCUMENTS

| | | | |
|---|---|---|---|
| 8,944,701 B2 | 2/2015 | Uboldi et al. | |
| 9,958,617 B2 | 5/2018 | Kock | |
| 10,036,861 B1* | 7/2018 | Ding | G02B 6/421 |
| 2015/0177463 A1 | 6/2015 | Lee et al. | |
| 2017/0254961 A1* | 9/2017 | Kamada | G02B 6/3821 |
| 2019/0004261 A1 | 1/2019 | Koch | |
| 2019/0302374 A1* | 10/2019 | Lee | G02B 6/3825 |
| 2019/0317281 A1* | 10/2019 | Watanabe | G02B 6/3825 |
| 2021/0003789 A1* | 1/2021 | Hsu | G02B 6/3893 |

FOREIGN PATENT DOCUMENTS

| | | |
|---|---|---|
| EP | 0 599 780 A1 | 6/1994 |
| EP | 2 144 100 A1 | 1/2010 |
| EP | 1 516 215 B1 | 12/2012 |
| EP | 3 196 684 A1 | 7/2017 |
| EP | 2 394 191 B1 | 12/2017 |
| JP | S60107906 A | 6/1985 |
| JP | 2010217854 A | 9/2010 |
| JP | 2012517033 A | 7/2012 |
| KR | 101513190 B | 4/2015 |
| WO | 2017/003934 A1 | 1/2017 |
| WO | 2017/129289 A1 | 8/2017 |
| WO | 2018003776 A1 | 1/2018 |

OTHER PUBLICATIONS

International Search Report Corresponding to PCT/EP2019/066641 dated Aug. 28, 2019.
Written Opinion Corresponding to PCT/EP2019/066641 dated Aug. 28, 2019.

* cited by examiner

CONNECTOR PART FOR AN OPTICAL PLUG-IN CONNECTION

This application is a National Stage completion of PCT/EP2019/066642 filed Jun. 24, 2019, which claims priority from European patent application serial no. 18180296.8 filed Jun. 28, 2018.

FIELD OF THE INVENTION

The invention relates to a connector part for an optical plug-in connection. A wide variety of such connector parts are known and commonly used for optical data transmission, wherein different connector types are used depending on the application. In this case, a distinction is made, amongst other things, between the type of end-surface coupling of the individual optical waveguides and the mechanism of the plug-in connection.

BACKGROUND OF THE INVENTION

A widely used and sometimes also standardized connecting mechanism is the so-called push/pull principle, in which the connector part to be connected locks as it is pushed into the mating connector part. The plug-in connection cannot be broken by pulling on the cable or on the connector housing. The release of the locking action takes place by pulling on an unlocking slide mounted on the connector housing. This mechanical connecting principle can be used for multi-fiber connectors in which a plurality of optical waveguides are arranged directly adjacent to one another in a row. The push-pull principle is, however, also used for simplex or duplex connectors, in which the optical waveguides are held centrically in a connector pin with high precision. Such a connector part is already described in EP 156 397 B1, for example.

A considerable disadvantage of known connector parts of this kind consists in that assembly and disassembly is complex and time-consuming. The connector parts are therefore unsuitable for field use, which is why, for example, in the event of damage to the plug-in connection or the optical waveguide cable, repair is only possible with considerable effort. This obviously leads to a relatively long interruption in the data transmission, which is no longer tolerable in today's commonly used fiber-optic networks leading to the terminal devices. It is desirable to also be able to re-establish a defective connection under aggravated field conditions, especially in emergency situations.

SUMMARY OF THE INVENTION

An object of the invention is therefore to provide a connector part for an optical plug-in connection, whereof the outer parts can be assembled quickly and preferably without tools, whilst still ensuring a high-precision plug-in connection with minimal transmission loss. In particular, however, the aim is to provide an option for accommodating two high-precision optical waveguide ferrules in a spatially optimized manner in a connector housing of the MPO (multi-fiber push on) construction standard. The connector part should moreover be economical to manufacture and easy to handle. This object is achieved by a connector part which has the features in the independent claim(s).

In this case, the connector part comprises a pin holder and at least two pin sleeves, which are received in the pin holder and in which a respective connector pin having an optical waveguide is fastened. The connector part further comprises a connector housing, which is connected to the pin holder and surrounds the connector pins completely or partially and which has latching means for creating a latching connection to a mating connector part. An unlocking slide is displaceably mounted on the connector housing to release the latching connection to the mating connector part. The pin holder consists of two mutually latchable or latching half shells and the connector housing can be, or is, likewise latched to the pin holder. A mating connector part here is understood to be a purely passive central part, which serves merely for connecting the connector part to another optical component, or another active connector part which has the coupling means itself.

All essential components can obviously be latched to one another, which simplifies assembly and disassembly considerably. The use of screws or screw nuts is dispensed with completely. The pin sleeves with the sensitive connector pins are nevertheless replaceable. For manufacturing reasons, the two half shells can be connected to one another by a film hinge, for example, or in another manner.

The inventive connector part can be used in a particularly optimum manner if the connector housing, the latching means and the unlocking slide are designed in such a way that the connector part corresponds to the MPO multi-fiber push on construction standard according to IEC 61754-7 and is compatible with a mating connector part of this construction standard. This construction standard is, in particular, widely used for multi-fiber connectors, so that multi-fiber connectors and duplex connectors can be alternatively used on existing device connections. In this case, the standard relates, amongst other things, to the outer dimensions and the latching of the connector parts.

Further considerable advantages in connection with field assembly can be achieved if the pin sleeves have a pin receiving portion in which the connector pin is held and a cable receiving portion for the connection to an optical waveguide cable. In this case, the cable receiving portion has two mutually connectable or connected sheath parts and an optical waveguide stub is held in the connector pin. This optical waveguide stub is already installed in the connector pin and preferably centered with high precision at the factory. The free end of the optical waveguide stub, facing the optical waveguide cable, can be, or is, spliced to the optical waveguide of the optical waveguide cable in the region of the two connected sheath parts. This technique is already known from EP 1 516 215 B1 or from EP 2 394 191 B1. The significant advantage consists in that, in the case of a field assembly of the connector pin, the sensitive optical waveguide is already fastened and centered in the connector pin. The connection to the optical waveguide cable takes place in a rear region by splicing, wherein the splice is covered and protected by the two mutually connected sheath parts. The attachment in the pin holder and the assembly of the actual connector housing do not take place until later. However, instead of this splicing technique, other techniques could also be optionally used for the assembly of the optical waveguide.

Optical plug-in connections react particularly sensitively to a change in the distance between the mutually opposing end faces of the connector pins. It is therefore advantageous if the pin sleeves are supported on the pin holder under spring pre-tension. It is thereby ensured that the mutually opposing connector pins are pressed against one another under spring-pre-tension, wherein the permissible spring deflection bridges forces acting in the opposite direction.

In order to be able to also assemble this spring mechanism quickly and easily, it is particularly expedient if a helical compression spring is mounted on each pin sleeve, which helical compression spring can be pushed over the connector pin onto the pin sleeve and is secured by means of a securing sleeve which can be pushed over the connector pin and latched to the pin sleeve. The helical compression springs can thus be assembled and secured from the connector end face, which obviously simplifies the assembly. The connector pins can have a diameter of 2.5 mm, corresponding to the established standard.

Further advantages can be achieved if a spherical lens is attached at the end face of each connector pin, which spherical lens is arranged within a clamping sleeve pushed onto the connector pin in such a way that the free end of the clamping sleeve projects beyond the outer surface of the spherical lens with respect to the longitudinal center axis of the connector pin. The spherical lens increases the cross-section of the light beam to be transmitted, which is in turn reduced by an identical spherical lens on the mating connector part. This measure enables an adequate data transmission even in the event of contamination or an increase in the distance between the mutually opposing connector pins. Since the clamping sleeves project beyond the outer surface of the spherical lenses, it is prevented that mutually opposing spherical lenses come into direct contact. Of course, other lens types could also be used instead of the spherical lenses. Moreover, the use of different ferrules or lenses is conceivable, in particular ferrules with a diameter of 1.25 mm.

The connector pins can be pushed into a socket part, which is latched to the connector housing and into which the connector pins of a mating connector part can be plugged. As a result of this simple measure, two connector parts of the same type can be designed with or without a socket part as a male or female connector. In this case, it is advantageous if a centering sleeve, mounted in a floating manner, is arranged in the socket part for each connector pin. This centering sleeve ensures that the mutually opposing connector pins arranged therein are centered precisely with respect to the outer sheath of the pins. It is thus possible to dispense with complex geometries for ensuring the optimum angular alignment during the assembly of the connector pins.

Further advantages in terms of the manufacture and assembly can be achieved if the two half shells of the pin holder are designed to be structurally identical and have at least one respective latching tongue and at least one respective latching opening. The pin holder therefore consists of two identical components, which can, however, be latched to one another such that they are facing one another. For reasons of better stability, it is advantageous in this case if the half shells have two respective latching tongues and two respective latching openings. In this case, the latching tongues and the latching openings are arranged on opposing longitudinal sides and offset on the half shells. The half shells can be manufactured particularly simply and cost-effectively as injection molded parts made from plastic material.

The pin holder preferably has a separate holding chamber for each pin sleeve, wherein the holding chambers are separated from one another by an intermediate web. The intermediate web improves the longitudinal stability and enables a large bearing surface for each pin sleeve. The lateral alignment of the two above-mentioned half shells can be further improved in that positioning lugs are arranged to engage in the intermediate web. In the pin holder or in the two half shells, a separate respective crimp sleeve bearing is moreover provided, which receives the crimp sleeves for the strain relief. In order to prevent the transmission of undesired torsion forces, individual portions of the crimp sleeve bearings can be flattened for twist prevention.

The pin holder advantageously further has a connecting portion, which can be, or is, pushed into the connector housing and on which at least one latching lug is arranged, which can be latched into a complementary latching opening in the connector housing. The pin holder and connector housing can be easily assembled by means of this measure. In this case, the connecting portion ensures adequate stability against transverse forces. Of course, in certain cases, it would also be conceivable for the latching lug to be arranged on the connector housing and the latching opening to be arranged in the pin holder. Other latching means, for example detents or the like, would also be conceivable. A bayonet closure would also be possible as an alternative type of mutual latching mechanism.

The connector housing is advantageously a single-piece component which has a separate receiving chamber for each pin sleeve, wherein the receiving chambers open with respect to one another in the longitudinal direction. The connector housing serves primarily to protect the sensitive connector pins, whereof the end faces protrude only slightly beyond the end face of the connector housing. It is possible to save on material due to the opening between the receiving chambers in the longitudinal direction. If the connector housing is manufactured from a plastic material in an injection molding procedure, the removal from the mold is thus moreover facilitated. The unlocking slide is advantageously pre-tensioned against the connector end face by means of two helical compression springs, wherein the helical compression springs are supported on a respective shoulder on the connector housing. In this case, the helical compression springs can be accommodated in a particularly advantageous and space saving manner on the longitudinal sides of the connector housing. The pulling force which is necessary to override the interlocking with a mating connector part can be set depending on the spring characteristic.

The invention also relates to a plug-in connection comprising a connector part described above and a mating connector part, which is designed either as a chassis socket which can be fastened to a housing wall or as a cable-end plug-in connector. Depending on the application, plug-in connections are thus possible on a housing wall or between two mobile cable-end plug-in connectors. Depending on whether the inventive connector part is designed as a male connector part or with a socket part as a female connector part, the chassis socket or the cable-end plug-in connector can also be a male or a female connector part.

Further advantages in the case of such a plug-in connection can be achieved if the mating connector part has, in addition to the two optical inputs which are complementary to the connector part, at least one electrical contact for creating an electrical plug-in connection. Such hybrid plug-in connections are already known, for example, from WO 2017/129289 A1 or from EP 3 196 684 A1.

Further advantages in the field assembly of a connector part described above or an alternative connector part according to the prior art can be achieved by a particular packaging of the spring elements which ensure that the connector pin of a connector part is held under spring pre-tension. This preferably relates to a blister packaging with deep-drawn recesses for receiving preferably a plurality of spring elements. Each packaging comprises at least one spring element, which has a helical compression spring which is provided with a securing sleeve at one end.

In this case, the spring element is placed into a receiving recess, which receives the spring element in a captive manner with respect to the longitudinal center axis. In this case, the helical compression spring is preferably completely relaxed. On the side with the helical compression spring which is remote from the securing sleeve, the receiving recess is, or can be, open for inserting a connector pin into the helical compression spring and into the securing sleeve or through this. On the side with the securing sleeve, the receiving recess is preferably elongated to the extent that an inserted connector pin can be received. The packaging moreover comprises at least one assembly recess, which, in comparison to the receiving recess, is shortened in such a way that a spring element received by an inserted connector pin in the receiving recess can be latched to the connector pin after the insertion into the assembly recess. The latching takes place as a result of the axial pressure of the pin holder against the helical compression spring, wherein this is also tensioned.

BRIEF DESCRIPTION OF THE DRAWINGS

Further advantages and individual features of the invention are revealed in the description below of exemplary embodiments and in the drawings, in which.

DETAILED DESCRIPTION OF THE PREFERRED EMBODIMENTS

Figures 1, 2:
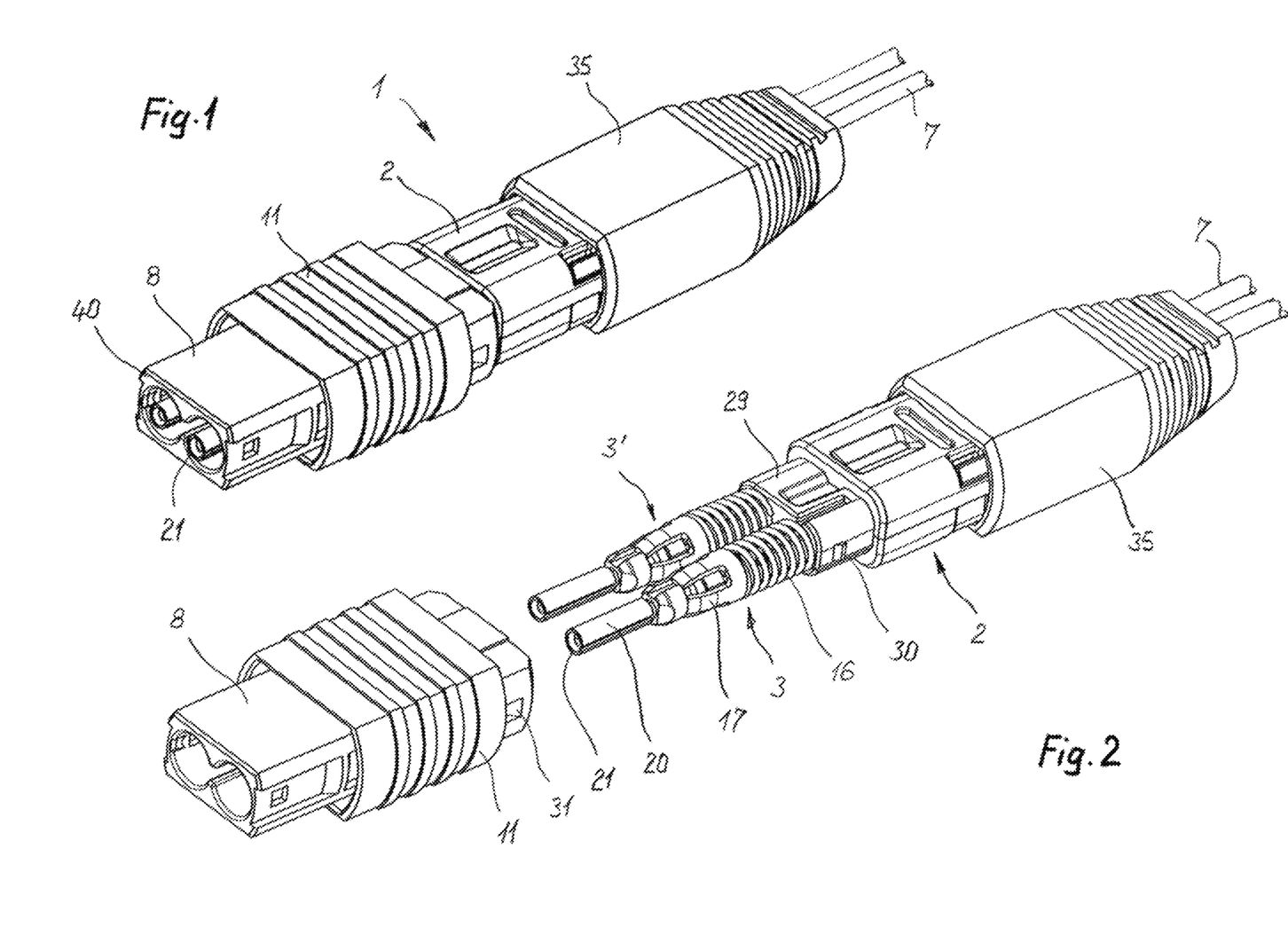
FIG. 1: shows an inventive connector part in an perspective illustration.
FIG. 2: shows the connector part according to FIG. 1, but with a connector housing separate from the pin holder and looking onto the two pin sleeves.

As can be seen from FIGS. 1 and 2, a connector part 1 consists substantially of a pin holder 2, the pin sleeves 3, 3' held therein and the actual connector housing 8 with the unlocking slide 11 displaceably mounted thereon. In the illustrated exemplary embodiment, the connector housing 8 with the latching means arranged thereon and the unlocking slide corresponds to the construction standard of the MPO connector family according to IEC 61754-7. Accordingly, the connector housing 8 substantially has an approximately cuboidal configuration with an approximately rectangular cross-section which is slightly rounded on the narrow sides.

The pin holder 2 is plugged into the connector housing 8 at a connecting portion 29, wherein lateral latching lugs 30 on the pin holder latch in corresponding latching openings 31 in the connector housing. In this case, the connector housing 8 protects the two pin sleeves 3, 3' and the connector pins 4 with the seated spherical lenses 19 (FIG. 5), which are not visible in FIGS. 1 and 2. Only the clamping sleeves 20 with which the spherical lenses are positioned are visible, and the ends 21 thereof, which protrude slightly beyond the connector end face 40.

An anti-kink device 35 can be pushed onto the pin holder from the cable side, which anti-kink device prevents the optical waveguide cable 7 from being routed away from the connector part with an impermissible bending radius.

Figure 3:
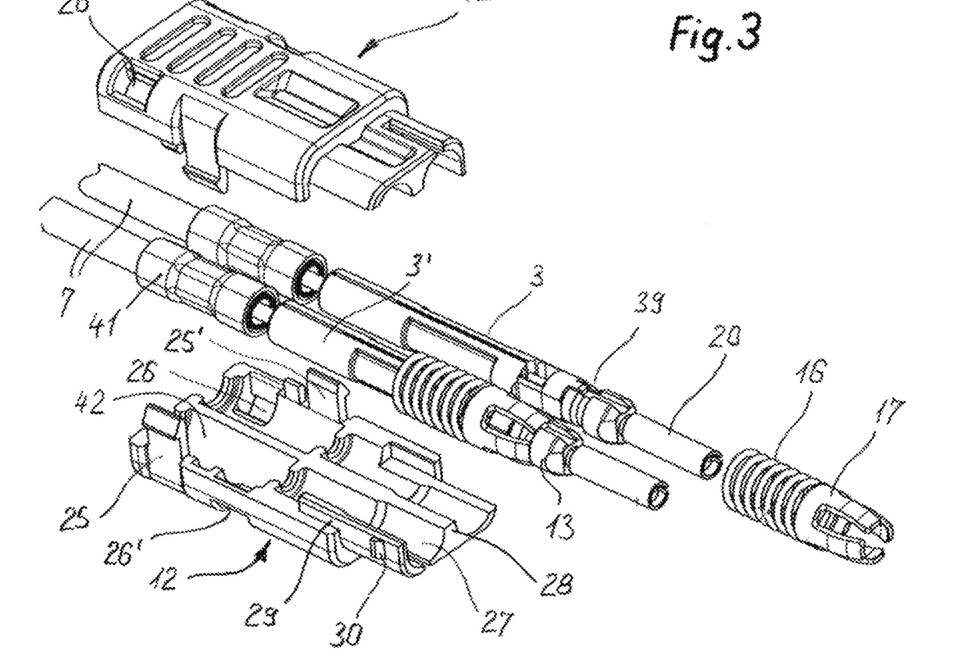
FIG. 3: shows a perspective illustration of the open pin holder with a respective helical compression spring before assembly and after assembly.
Figure 4:
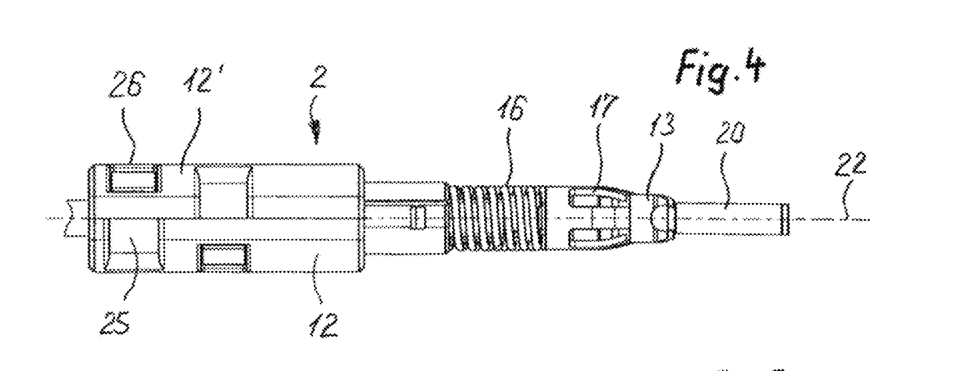
FIG. 4: shows a side view of the closed pin holder according to FIG. 3, FIG. 5: shows a cross-section through the pin holder according to FIG. 4, FIG. 6: shows a perspective illustration of a pin sleeve after the connection to an optical waveguide cable.
Figure 5:
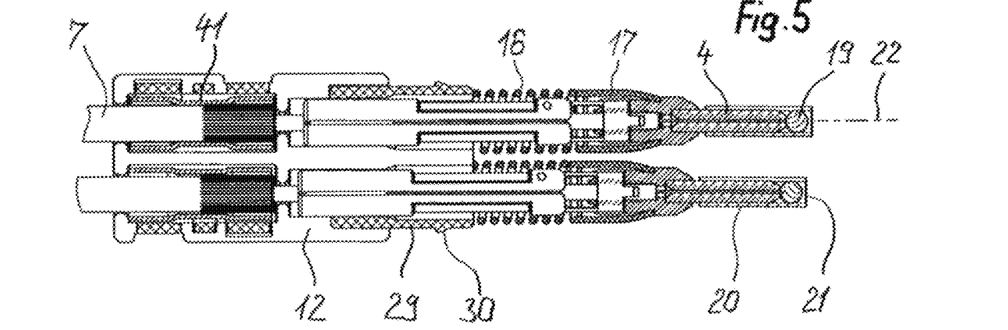

Further details of the pin holder 2 and the pin sleeves 3, 3' arranged therein can be seen from FIGS. 3, 4 and 5. As can be seen in particular from FIG. 3, the pin holder 2 consists of two structurally identical half shells 12, 12', which can be latched to one another after the insertion of the pin sleeves 3', 3'. For this purpose, two respective latching tongues 25, 25' and two respective latching openings 26, 26' are arranged laterally and offset on each half shell. If the half shells are placed on top of one another, each latching tongue engages in the corresponding latching opening of the opposing shell so that a stable, but releasable connection is produced.

Each pin sleeve 3, 3' has a separate holding chamber 27, wherein the two holding chambers are separated from one another by an intermediate web 28. The strain relief of the optical waveguide cables 7 takes place via crimp sleeves 41, for which a separate crimp sleeve bearing 42 is provided in the pin holder or in the two half shells 12, 12'.

As can be seen from FIG. 5, a connector pin 4, which corresponds to the construction principle known in the prior art (e.g. E-2000®), is installed in each pin sleeve 3, 3'. A clamping sleeve 20 is pressed onto each connector pin, which clamping sleeve positions a spherical lens 19 at the end-face end of the connector pin and, more precisely, in such a way that the center of the spherical lens lies exactly on the longitudinal center axis 22 of the connector pin. In this case, the end 21 of the clamping sleeve projects slightly beyond the outer surface of the spherical lens, whereby the spherical lens is arranged somewhat set back in the clamping sleeve. Further details of the pin sleeve are explained below with reference to FIGS. 6 and 7. The pin sleeves assembled at the factory can be field installed in the pin holder 2 on-site, wherein each pin sleeve is to be equipped with a helical compression spring 16 at the same time. As illustrated on the right in FIG. 3, the helical compression spring is pushed over the connector pins or over the clamping sleeves 20 and, more precisely, together with a securing sleeve 17 whereof the claws latch in a circumferential groove 39. In the assembled state, each helical compression spring 16 is supported on the pin holder, whereby each pin sleeve 3, 3' can cover a certain spring deflection if a force acts against the pre-tensioning force of the helical compression spring in the direction of the longitudinal center axis 22. Pulling forces and vibration loads acting on the plug-in connection in a manner known per se can therefore be compensated. The assembly of the helical compression springs over the connector pins is obviously particularly advantageous since the assembly can also take place after the connection of the optical waveguide cables 7. As will be described in more detail below, a specially configured packaging of the helical compression springs can be used as an assembly aid.

Figure 6:
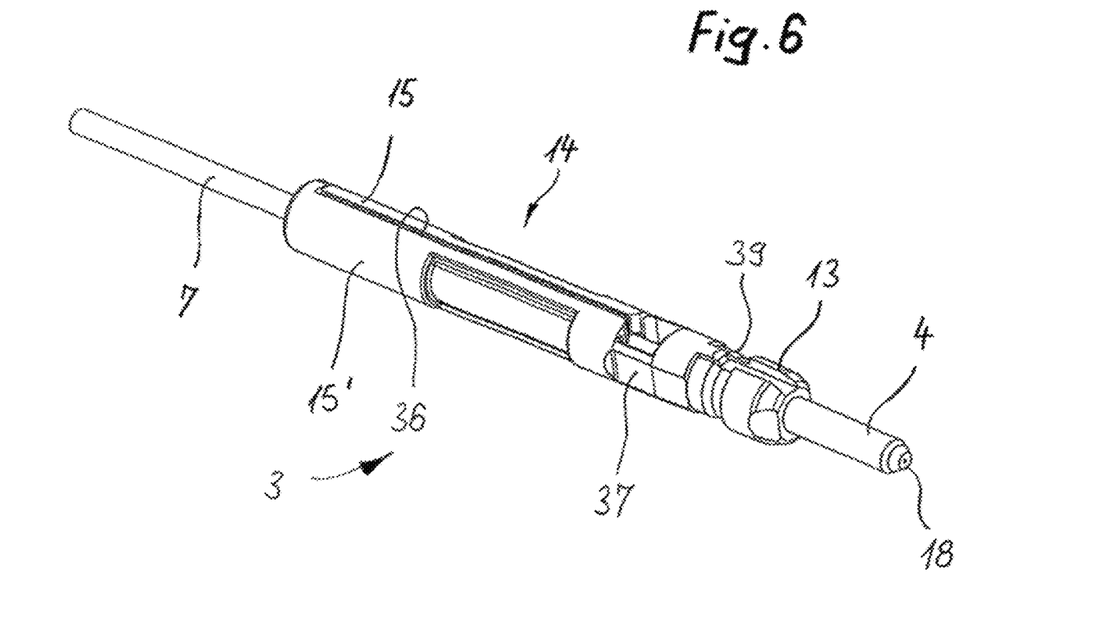
Figure 7:
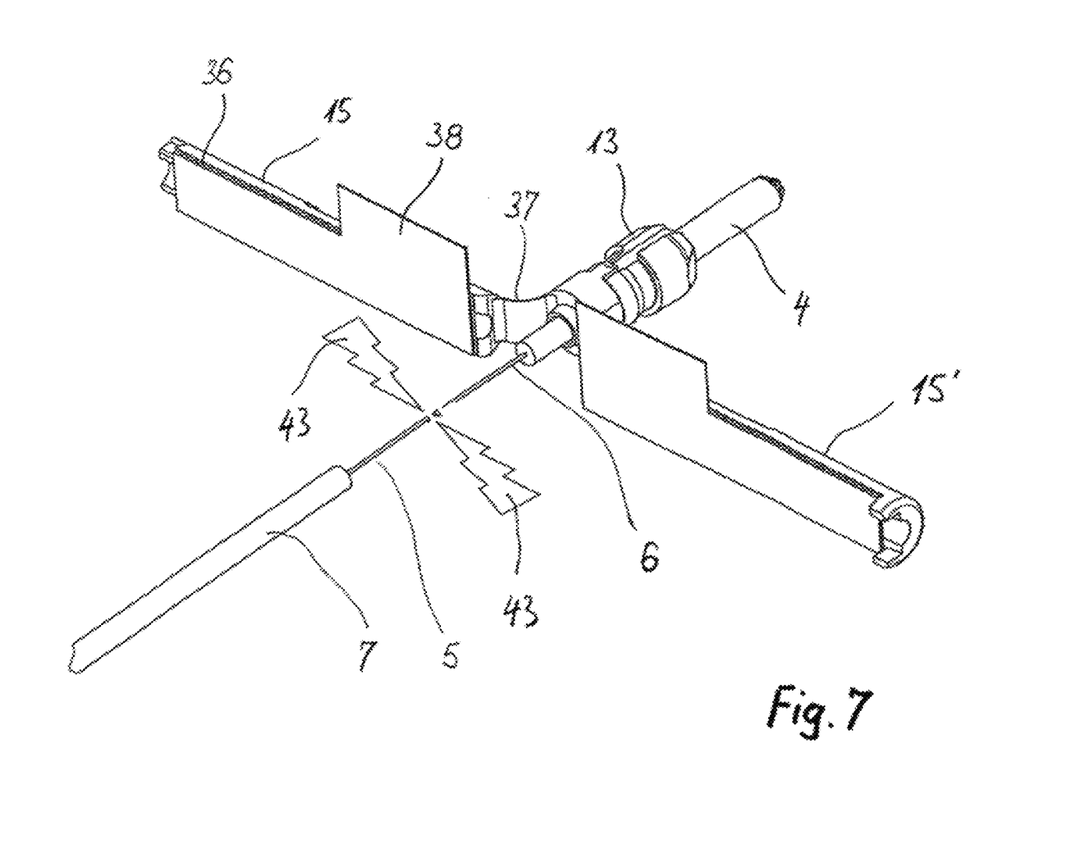
FIG. 7: shows a perspective illustration of the pin sleeve according to FIG. 6 from another viewing angle before the connection to an optical waveguide cable.

Further details of a pin sleeve 3, which are already known from the prior art, can be seen from FIGS. 6 and 7. This pin sleeve consists of a pin receiving portion 13 with a circumferential groove 39 (see also FIG. 3). The connector pin 4 is inserted into the pin receiving portion 13 by its end face 18. The pin sleeve 3 further consists of a cable receiving portion 14, which is, however, formed by the two sheath parts 15, 15'. These two sheath parts are connected to the pin receiving portion 13 via a respective film hinge 37 in such a way that the sheath parts can be swung open, as can be seen in FIG. 7. Each sheath part is provided with an adherent layer 36 on its contact surface, which adherent layer is protected by a protective foil 38.

An optical waveguide stub 6 is already inserted centrically into the connector pin 4, as far as the end face 18, with high precision. A pin sleeve set which is pre-assembled in such a way can now be field connected to the optical waveguide cable 7. For this purpose, the optical waveguide conductor 5, freed from the protective sheath, of the optical waveguide cable 7 is spliced to the end of the optical waveguide stub 6, which is illustrated symbolically by the splicing electrodes 43. The splicing procedure takes place in a mobile splicing device, which is likewise already known to a person skilled in the art from the prior art. After the splicing procedure, the protective foils 38 are removed from the adherent layer 36 and the two sheath parts 15, 15' are pressed against one another about the film hinges 37, thereby producing the pin sleeve illustrated in FIG. 6. After seating the crimp sleeves 41, these pin sleeves can be installed in the pin holder, as described above.

Figure 8:
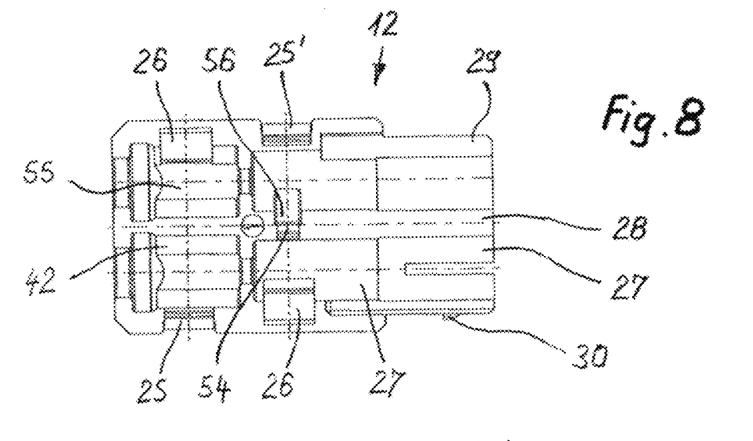
FIG. 8: shows a plan view of an alternative exemplary embodiment of a half shell of the pin holder according to FIG. 3, FIG. 9: shows an end-face view of the half shell according to FIG. 8, FIG. 10: shows a partially sectional side view of the half shell according to FIG. 8, FIG. 11: shows a perspective illustration of the connector housing according to FIG. 2 before the assembly of the unlocking slide.
Figure 9:
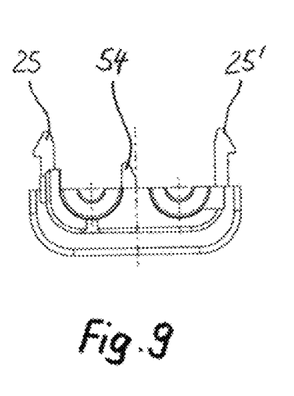
Figure 10:
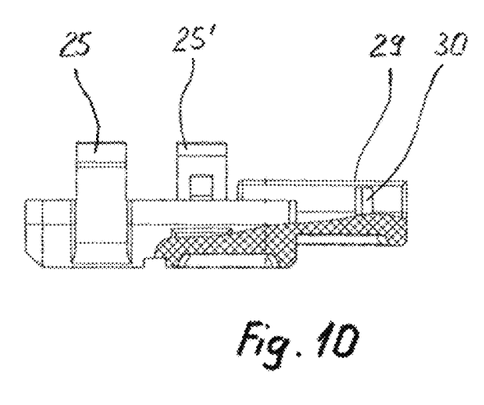

A half shell 12, which is modified somewhat in comparison to FIG. 3, is illustrated in FIGS. 8 to 10. To improve the lateral alignment of two assembled half shells, a positioning lug 54 is arranged in the intermediate web 28, offset with respect to the axis of symmetry. This positioning lug engages in a corresponding and likewise eccentrically arranged cutout 56 in the opposing half shell. Therefore, transverse forces between the two placed-together half shells obviously do not have to be absorbed only by the two latching tongues 25, 25'.

A further difference in the exemplary embodiment illustrated here also further consists in that the two crimp sleeve bearings 42 have a respective flattened portion 55. This serves for the anti-twist protection of the inserted crimp sleeves on a corresponding surface. Undesired torsion forces proceeding from the cable can thus be absorbed.

Details of the connector housing 8 can be seen from FIGS. 11 to 14. The actual connector housing 8 is a single-piece component which, on the side facing the pin holder 2, is provided with a shoulder 34 on each narrow side. Helical compression springs 33 are supported on these shoulders, which helical compression springs pre-tension the unlocking slide pushed onto the connector housing 8 in the direction of the connector end face 40. The unlocking slide 11 is designed as a closed sleeve, which surrounds the connector housing 8 completely. In the pre-tensioned state, the unlocking slide 11 covers the likewise laterally arranged recesses 9, which serve as a latching means for latching to a mating connector part. By pulling back the unlocking slide 11 against the pre-tensioning force of the helical compression springs 33, the latching means 9 are exposed so that the latching connection of the connector housing can be released. The latching openings 31 for the latching of the pin holder are arranged in the widened part of the connector housing, behind the supporting shoulders 34.

The connector housing 8 forms a respective receiving chamber 32 for receiving the pin sleeves. However, as can be seen in particular in FIG. 13, these receiving chambers, which are circular in cross-section, are not separate from one another, but are open with respect to one another in the longitudinal direction.

Figure 11:
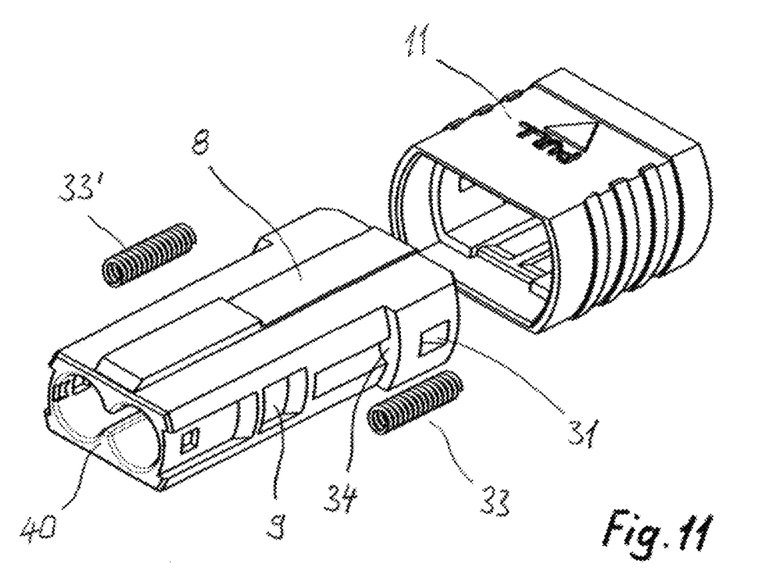
Figure 12:
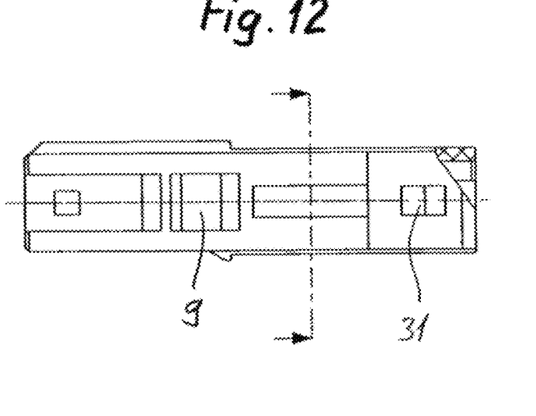
FIG. 12: shows a side view of the connector housing according to FIG. 11, FIG. 13: shows a cross-section through the connector housing according to FIG. 12, FIG. 14: shows a longitudinal section through the connector housing according to FIG. 12, FIG. 15: shows a perspective illustration of an alternative connector housing with an installed socket part.
Figure 13:
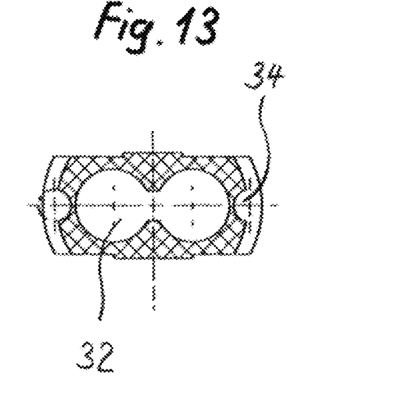
Figure 14:
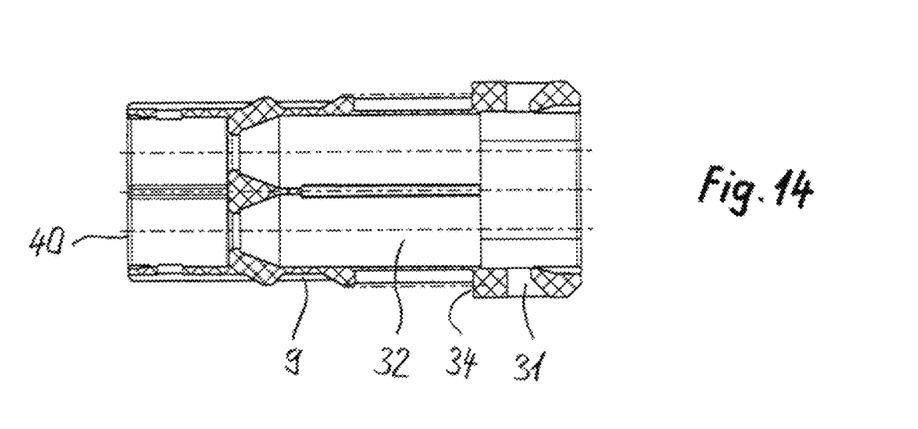
Figure 15:
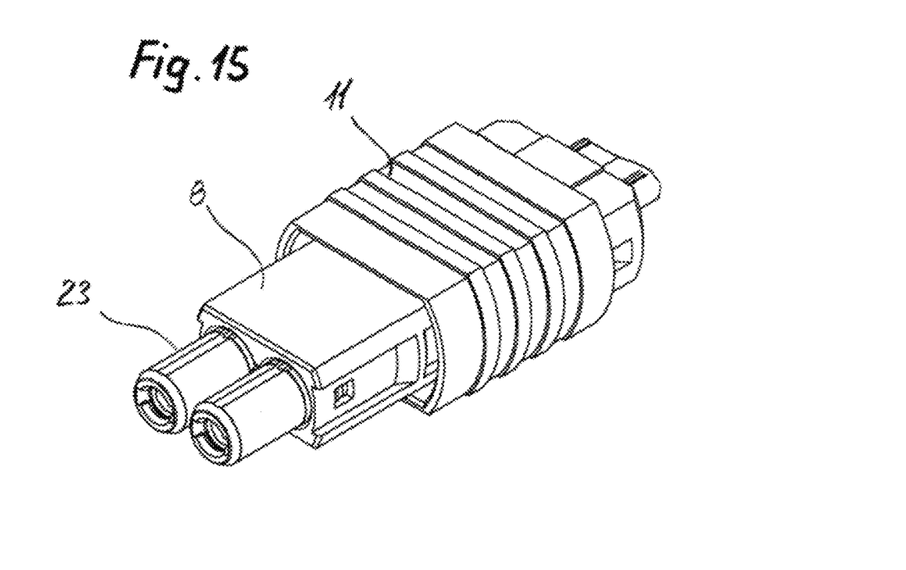
Figures 16, 17:
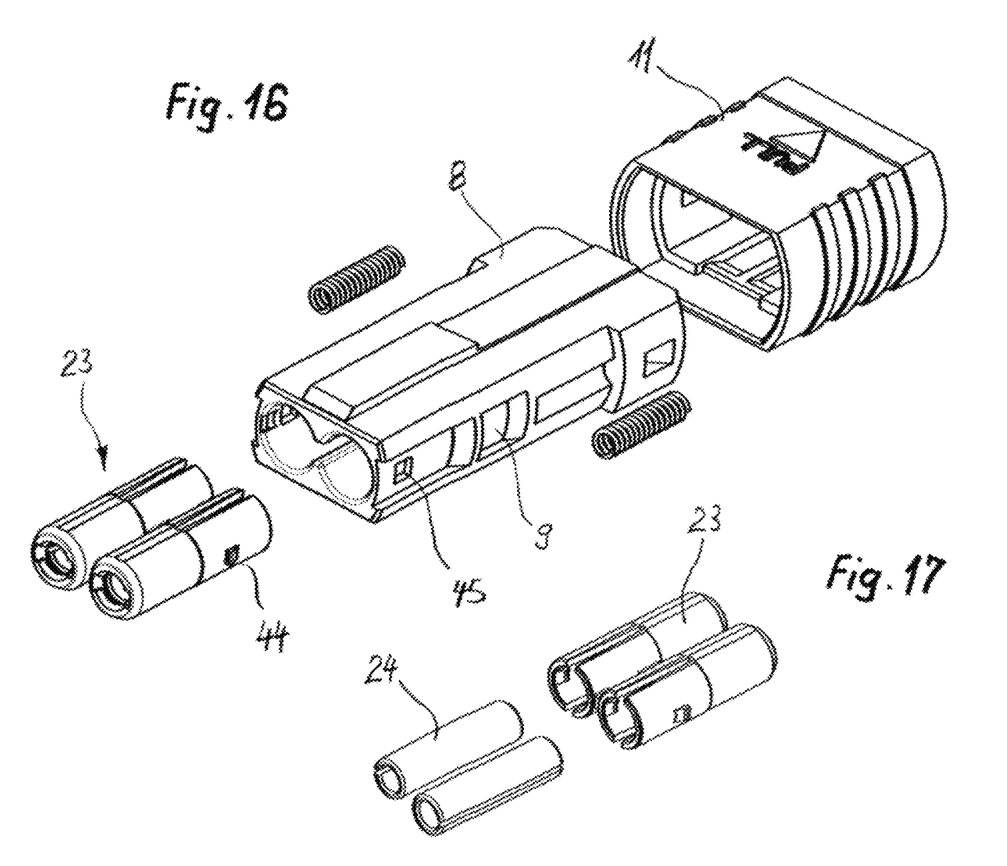
FIG. 16: shows a perspective illustration of the connector housing according to FIG. 15 before the assembly of the unlocking slide and with the socket part removed.
FIG. 17: shows a perspective illustration of the socket part according to FIG. 16 with the centering sleeves removed.

FIGS. 15 to 17 show a female version of a connector part with a socket part 23 inserted into the connector housing 8 from the end face 40. The construction of the connector housing with the seated unlocking slide 11 is completely identical, as illustrated in FIG. 11. However, the connector pins or the clamping sleeves surrounding them do not lie freely in the connector housing, but are plugged up to half way into the socket part 23. Slotted centering sleeves 24 are mounted in a floating manner within the socket part for each connector pin. The socket part 23 can be latched into the connector housing 8, wherein the nubs 44 on the socket part latch into the latching openings 45 on the connector housing.

The installed socket part 23, which serves, amongst other things, as a pre-centering unit, enables the connector pins or the clamping sleeves to receive a mating connector part. In this case, the use of the socket part 23 is optional depending on the mating connector part to which the respective connector part is to be coupled.

Figures 18, 19:
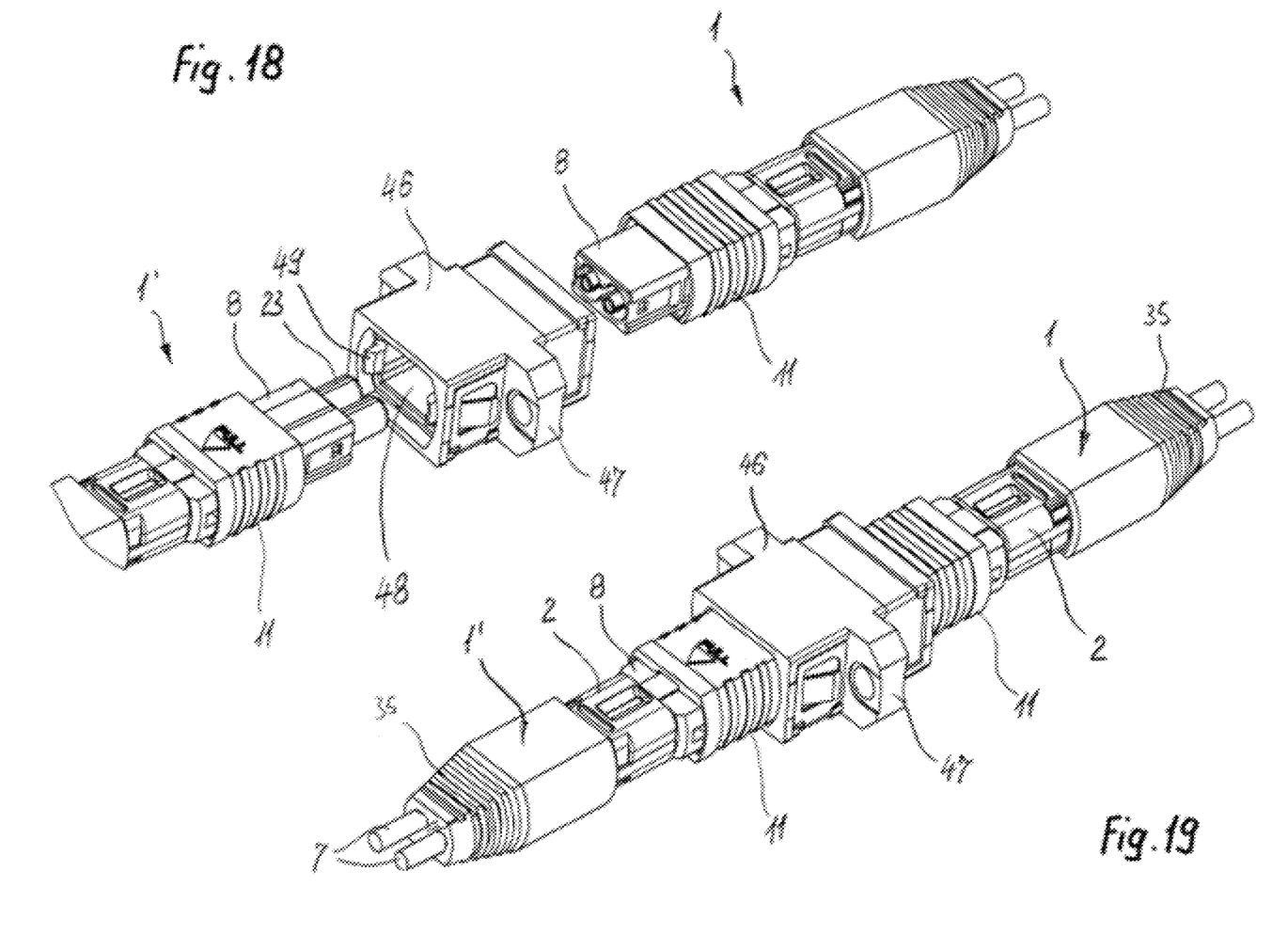
FIG. 18: shows a perspective illustration of a coupling socket with a respective connector part on both sides in the unplugged state.
FIG. 19: shows the connector arrangement according to FIG. 18 in the plugged-in state.

FIGS. 18 and 19 show a female connector part 1' according to FIG. 15, which is coupled to a male connector part 1 according to FIG. 11. A central part 46 serves for the pull-resistant locking of the respective connector housing, which central part can be assembled, for example, on a device wall by means of the lateral flange 47. The central part has a through opening 48 into which the connector housing of the two connector parts 1 and 1' can be plugged from both sides. As can be seen from FIG. 18, the through opening 48 is flanked on both sides by resilient detents 49 at the entrance. During the plugging in of each connector part, these detents are spread apart until they latch into the lateral recesses 9 in the connector housings (FIG. 11). Until the ultimate latching, the unlocking slides are thereby pushed back against the pre-tensioning force of the helical compression springs 33 until they cover the detents 49 after the latching procedure and thus secure them in the recesses. The locked state cannot be released by a pull on the cable or on the connector housing. On the other hand, the detents 49 are freed by a pull on the unlocking slide, whereby the plug-in connection can be released.

Figure 20:
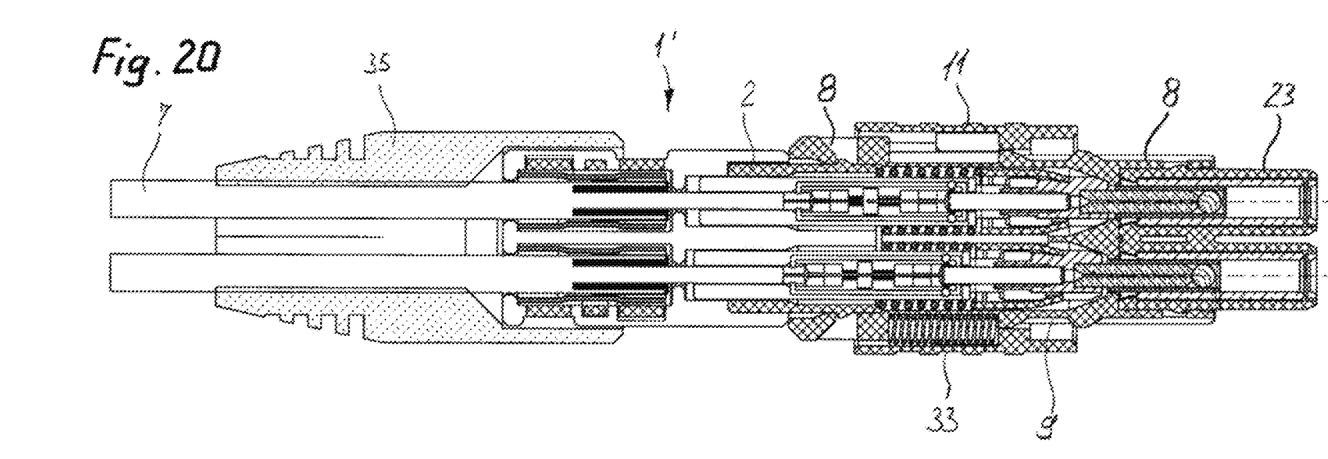
FIG. 20: shows a longitudinal section through the connector part 1' with an installed socket according to FIG. 18, FIG. 21: shows a longitudinal section through the plug-in connection according to FIG. 19, FIG. 22: shows a perspective illustration of a chassis socket with additional electrical contacts.

For better understanding, the female connector part 1' according to FIG. 18 is illustrated again in longitudinal section in FIG. 20. In particular, the latching mechanisms between the pin holder 2 and the connector housing 8 and between the connector housing 8 and the socket part 23 on the side with the connector pins are visible here. Only one of the helical compression springs 33 for pre-tensioning the unlocking slide 11 is illustrated here. The lateral latching-means recesses 9, which are covered by the unlocking slide 11, are clearly visible.

Figure 21:
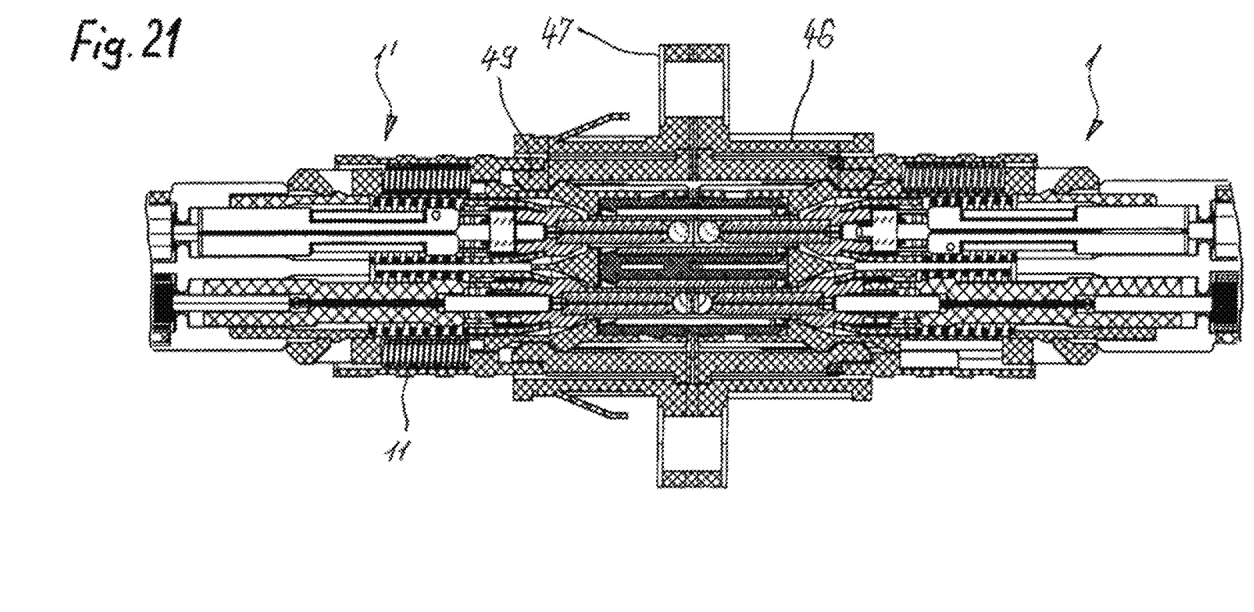

FIG. 21 shows a longitudinal section through the plug-in connection according to FIG. 19. The detents 49 are latched into the latching-means recesses of the respective connector housing and covered by the unlocking slide 11, whereby a spreading apart of the detents, and therefore an unlatching, is no longer possible. The clamping sleeves of the male connector part 1 are pushed into the socket part 23 of the female connector part 1', wherein the ends 21 of the clamping sleeves contact one another. In this case, in the upper optical waveguide connection in the drawing in FIG. 21, it is clearly shown that a clearance remains between the two spherical lenses, which clearance, however, is easily bridged by the widened light beam. In the lower optical waveguide connection in the drawing, a hypothetical situation is illustrated, which shows the maximum possible movement of each spherical lens in one direction in each case.

Figure 22:
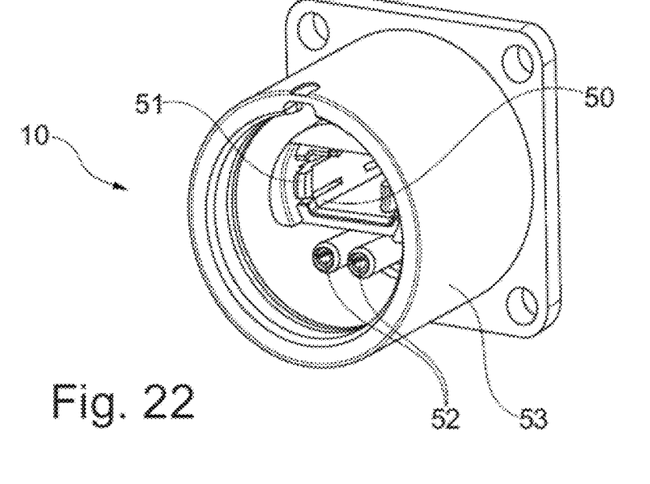
Figure 23:
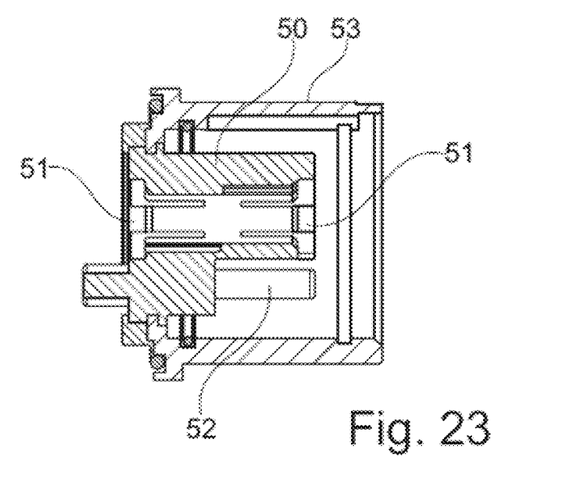
FIG. 23: shows a longitudinal section through the chassis socket according to FIG. 22, FIG. 24: shows a perspective illustration of a mating cable-end connector part, with additional electrical contacts.
Figure 24:
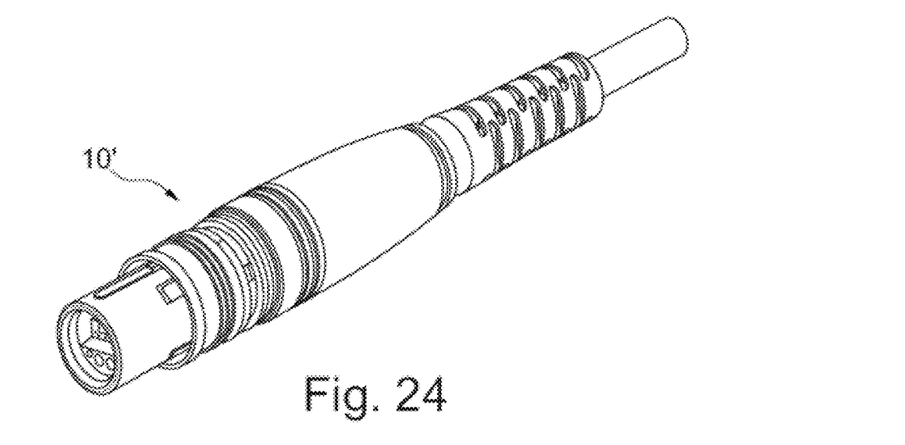

The FIGS. 22 to 24 show alternative embodiments of a mating connector part 10. According to FIGS. 22 and 23, this relates to a chassis socket, which can be fastened to a device wall, similarly to the central part 46 according to FIG. 21. A connector receptacle 50 is held in the substantially rotationally symmetrical housing 53 of the chassis socket, which connector receptacle serves to receive the connector parts described above. In this case, the latching takes place at the detents 51 in the same manner as described with reference to FIG. 21. In addition, however, the connector receptacle 50 also supports electrical contact sockets 52 via which an electrical contact can be established.

In the region of the mating interface, the mating cable-end connector part 10' according to FIG. 24 is designed similarly to the chassis socket according to FIG. 22. The only difference consists in that the mating connector part is not intended to establish a plug-in connection on a housing wall, but between two freely movable cable-end connector parts.

Figures 25, 26:
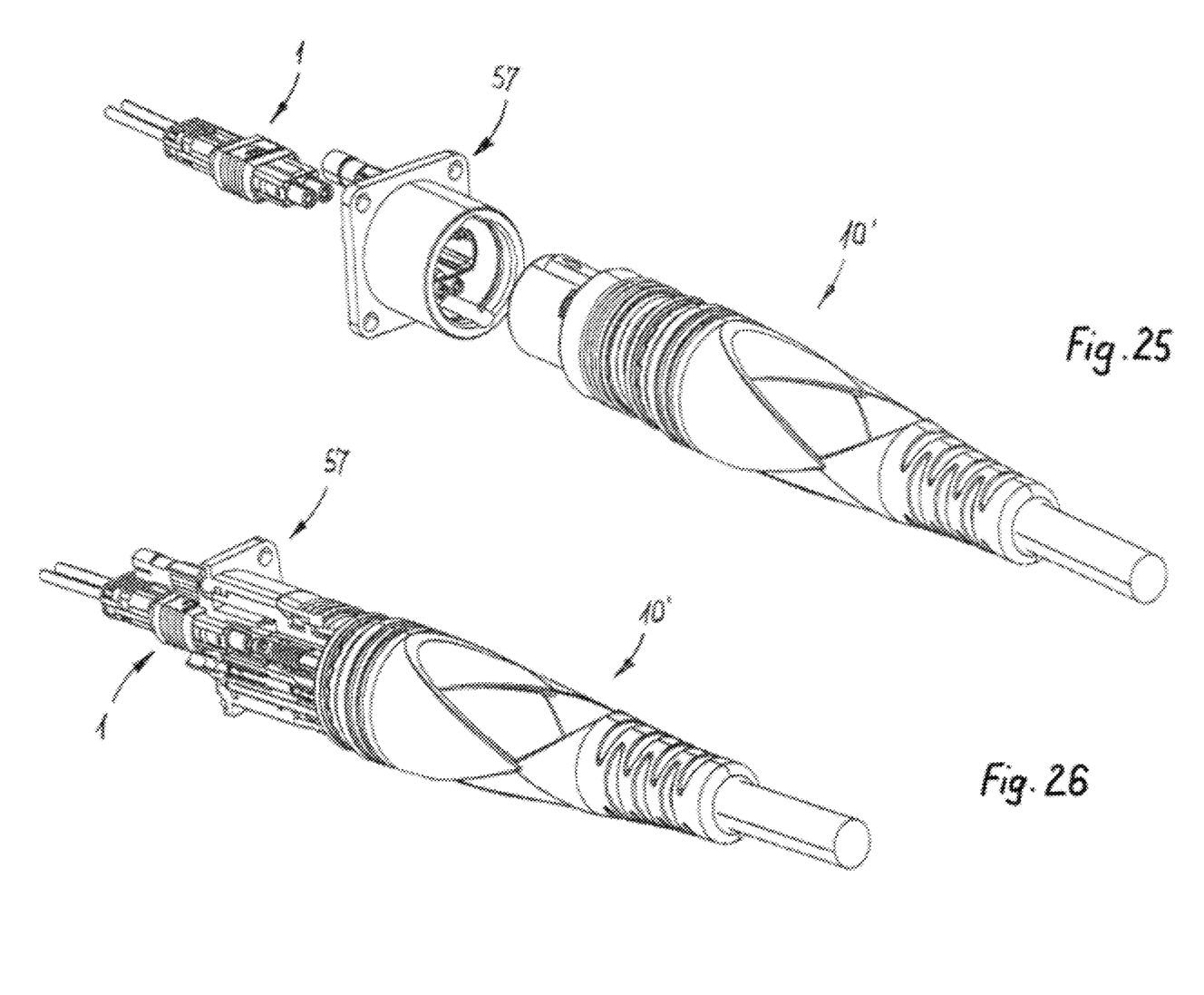
FIG. 25: shows a perspective illustration of an arrangement consisting of a connector part, chassis socket and mating connector part before assembly.
FIG. 26: shows the arrangement according to FIG. 25 in the assembled state.

FIGS. 25 and 26 again show an arrangement consisting of a connector part 1, chassis socket 57 and mating connector part 10 in the released and in the assembled state. With regard to the details, please refer to the preceding figures, in particular FIGS. 22 to 24.

Figure 27:
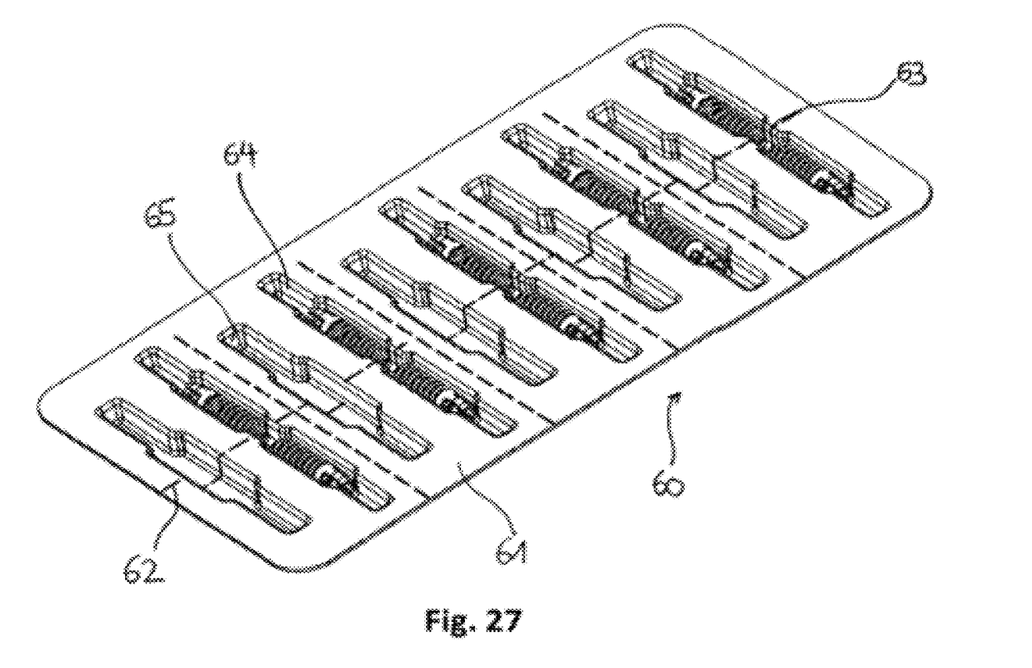
FIG. 27: shows a perspective illustration of a blister packaging for a plurality of spring elements.
Figure 28:
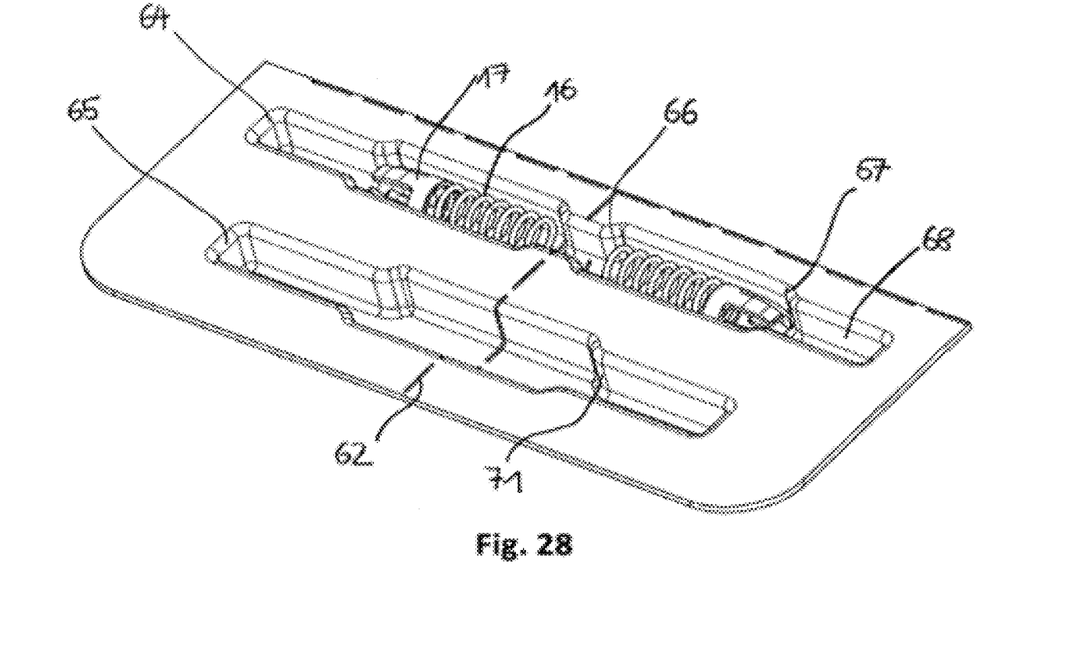
FIG. 28: shows an enlarged detail of the illustration according to FIG. 27, and FIG. 29 to 31 show sequential illustrations during the latching of a spring element to a connector pin.

FIGS. 27 and 28 show a particularly advantageous packaging 60 for packaging spring elements 63, such as can be used in an inventive connector part. In this case, each spring element consists of a helical compression spring 16, which is provided with a securing sleeve 17 at one end. Such spring elements are illustrated in FIG. 3, for example, and described therein. However, such a packaging with its inventive features could also be used in connection with conventional connector parts. The object of the packaging consists in that it protects the spring elements before the possible field use and in that it can, at the same time, be used as an assembly aid. To this end, a packaging 60 consists of a recessed plate 61, for example made from plastic material, in which receiving recesses 64 are formed which receive the individual spring elements 63. The recessed plate can be closed, for example, by means of a transparent plastic foil, corresponding to the classic blister packaging principle. According to an exemplary embodiment, the recessed plate 61 is provided with a predetermined breaking point 62, which divides the recessed plate into two symmetrical halves. An assembly recess 56 is associated with each receiving recess 64.

As can be seen from the partial illustration according to FIG. 28, each receiving recess 64 has a respective supporting shoulder 66 for the exposed part of the helical compression spring 16 and a supporting shoulder 67 for the securing sleeve 17. An individual spring element is therefore held in a captive manner with respect to the longitudinal center axis of the receiving recess 64. The receiving recess is provided with an elongation 68 on the side with the securing sleeve 17. The parallel-arranged assembly recess 65 is shorter than the receiving recess 64 and moreover designed to be somewhat wider. An abutment shoulder 71 enables the actual latching of the spring element onto the pin sleeve, as described below.

Figure 29:
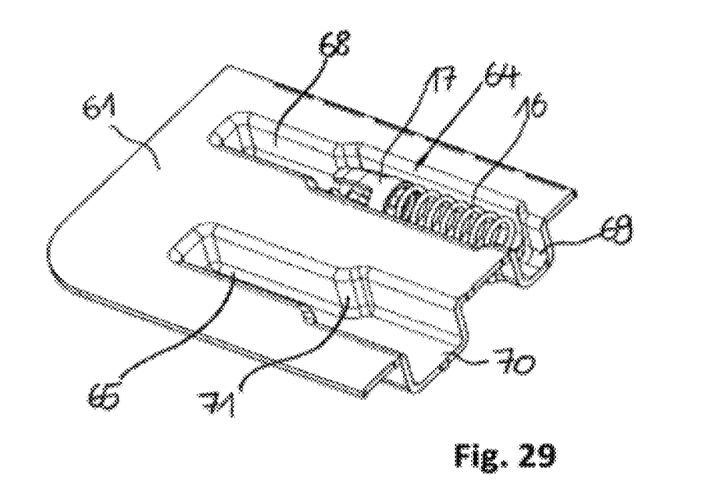
Figure 30:
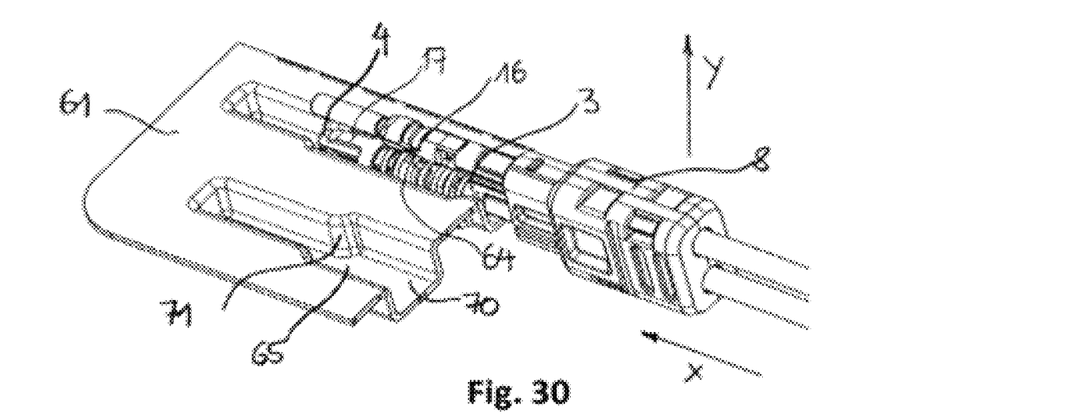

FIG. 29 shows the left part of the portion according to FIG. 28 after the right part has been broken along the predetermined breaking point 62. This results in an axially accessible opening 69 in the receiving recess 64 and a correspondingly wider opening 70 in the assembly recess 65. As can be seen in FIG. 30, the pin sleeve 3 of a connector housing 8 is now pushed in through the opening 69, wherein the connector pin 4 penetrates the helical compression spring 16 and the securing sleeve 17. In this respect, please refer again to the analogous situation according to FIG. 3. The force direction is indicated by the arrow x. In this case, the spring element 63 always remains in the same location relative to the recessed plate 61.

Figure 31:
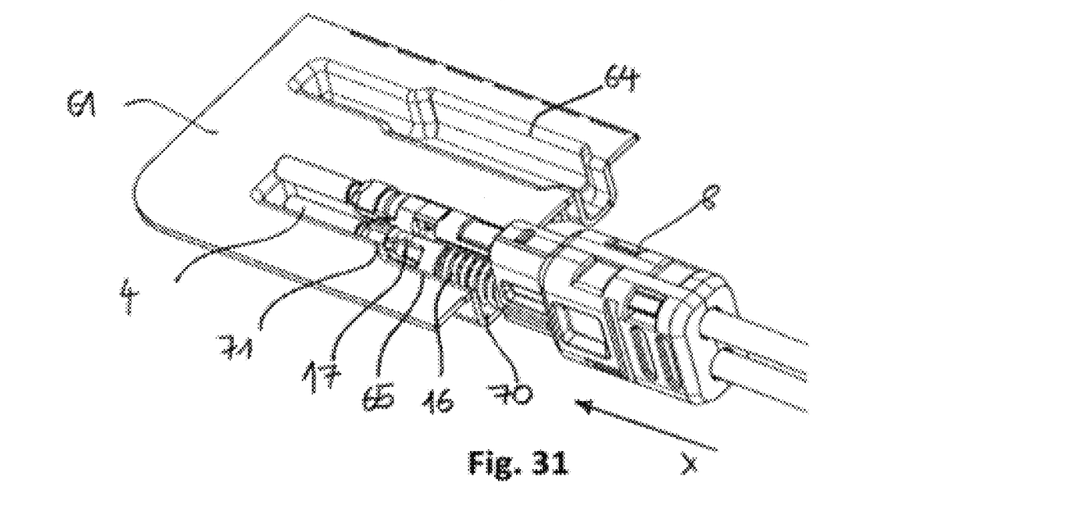

After the spring element has been received in the receiving recess 64, the entire unit is lifted out of the receiving recess in the arrow direction y and inserted into the assembly recess 65 from the opening 70 in the arrow direction x according to FIG. 31. In this case, the securing sleeve 17 abuts against the abutment shoulder 71 and the feed movement in the arrow direction x is continued until the securing sleeve 17 latches in the corresponding groove in the pin receptacle (groove 39 in FIG. 3). In this case, the helical compression spring 16 is obviously also pre-tensioned. After the latching in of the securing sleeve 17, the packaging portion can be removed. An assembly aid is obviously always available with such a packaging so that direct contact with the components is not required. Moreover the relatively small spring elements are received captively and separately, which facilitates the work substantially, in particular for field use.

The invention claimed is:

1. A connector part for establishing an optical plug-in connection to a mating connector part, the connector part comprising
   a pin holder,
   at least two pin sleeves, which are received in the pin holder and in which a respective connector pin having an optical waveguide is fastened, wherein the pin sleeves are supported on the pin holder under spring pre-tension, wherein for each pin sleeve a respective spring portion is on an outer portion of a securing sleeve formed outside the pin holder, a connector housing, which is connected to the pin holder and surrounds the connector pins completely or partially and which has latching means for creating the plug-in connection to the mating connector part by providing a latching connection to the mating connector part, and an unlocking slide, which is slideably mounted on the connector housing to release the latching connection to the mating connector part, wherein the pin holder consists of two mutually latchable or latching half shells, and wherein the connector housing can be, or is, likewise latched to the pin holder.

2. The connector part as claimed in claim 1, wherein the connector housing, the latching means and the unlocking slide are designed in such a way that the connector part corresponds to the MPO multi-fiber push on construction standard according to IEC 61754-7 and is compatible with a mating connector part of this construction standard.

3. The connector part as claimed in claim 1, wherein the pin sleeves have a pin receiving portion in which the connector pin is held and a cable receiving portion for the connection to an optical waveguide cable, wherein the cable receiving portion has two mutually connectable or connected sheath parts and wherein an optical waveguide stub is held in the connector pin, the free end of which optical waveguide stub, facing the optical waveguide cable, can be, or is, spliced to the optical waveguide of the optical waveguide cable in the region of the two connected sheath parts.

4. The connector part as claimed in claim 1, wherein a helical compression spring is mounted on each pin sleeve, which helical compression spring can be pushed over the connector pin onto the pin sleeve and is secured by means of a securing sleeve which can be pushed over the connector pin and latched to the pin sleeve.

5. The connector part as claimed in claim 1, wherein a spherical lens is attached at the end face of each connector pin, which spherical lens is arranged within a clamping sleeve pushed onto the connector pin in such a way that the free end of the clamping sleeve projects beyond the outer surface of the spherical lens with respect to the longitudinal center axis of the connector pin.

6. The connector part as claimed in claim 1, wherein the connector pins are pushed into a socket part, which is latched to the connector housing and into which the connector pins of a mating connector part can be plugged.

7. The connector as claimed in claim 6, wherein a centering sleeve, mounted in a floating manner, is arranged in the socket part for each connector pin.

8. The connector part as claimed in claim 1, wherein the two half shells of the pin holder are designed to be structurally identical and have at least one respective latching tongue and at least one respective latching opening.

9. The connector part as claimed in claim 1, wherein the pin holder has a separate holding chamber for each pin sleeve, wherein the holding chambers are separated from one another by an intermediate web.

10. The connector part as claimed in claim 1, wherein the pin holder has a connecting portion, which can be, or is, pushed into the connector housing and on which at least one latching lug is arranged, which can be latched into a complementary latching opening in the connector housing.

11. The connector part as claimed in claim 1, wherein the connector housing is a single-piece component which has a separate receiving chamber for each pin sleeve, wherein the receiving chambers open with respect to one another in the longitudinal direction.

12. The connector part as claimed in claim 1, wherein the unlocking slide is pre-tensioned against the connector end face by means of two helical compression springs, wherein the helical compression springs are supported on a respective shoulder on the connector housing.

13. A plug-in connection comprising a connector part as claimed in claim 1 and a mating connector part, which is designed either as a chassis socket which can be fastened to a housing wall or as a cable-end plug-in connector.

14. The plug-in connection as claimed in claim 13, wherein the mating connector part has, in addition to the two optical inputs which are complementary to the connector part, at least one electrical contact for creating an electrical plug-in connection.

* * * * *